3,333,789
OFF-ON TYPE MISSILE CONTROL SYSTEM
Charles W. Schreiner, Jr., Huntsville, Ala., assignor to the United States of America as represented by the Secretary of the Army
Filed July 18, 1963, Ser. No. 296,138
1 Claim. (Cl. 244—3.15)

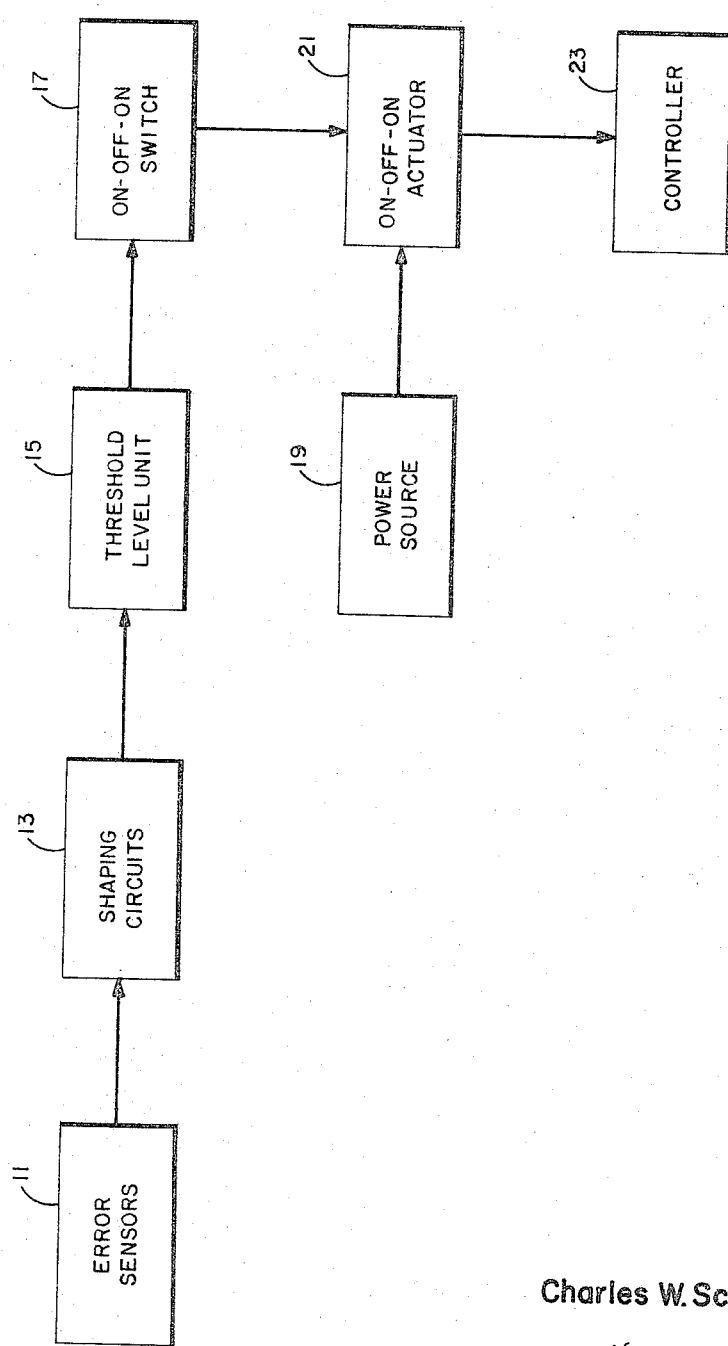

The invention described herein may be manufactured and used by or for the Government for governmental purposes without the payment of any royalty thereon.

This invention relates to an improved missile control system. More specifically, it relates to an "off-on" type of missile control whereby open loop, "off-on" actuation devices are utilized in a closed loop control system. In this system full control is called for when the magnitude of the missile control term exceeds a predetermined threshold level.

It is known that previous missile control systems utilize proportional actuators where the level of the control force is a proportional function of detected error, or where "off-on" actuator devices are used in a pulse width system where the actuator is driven at a frequency which is higher than the missile response capability. By modulating the pulse width and hence the dwell time of the controller in either direction as a proportional function or error signal, a proportional control force can be applied to a missile.

A critical factor in the guidance of a rocket is the accurate determination of the velocity vector at thrust termination. A free-flight rocket during its burning time is subject to disturbing forces such as thrust malalignment and high speed winds which may produce an unacceptable velocity vector at thrust termination. Certain production and engineering controls which have been exercised over a free-flight rocket to improve velocity vector have not proved entirely satisfactory.

It is therefore an object of this invention to provide a system which exercises automatic control over the velocity vector at thrust termination of an artillery-type weapon system.

It is another object of this invention to provide a missile control system utilizing an "off-on" type of control.

It is also an object of this invention to exercise directional control of a missile during the boost phase of operation by use of heading and drift type of controls.

It is a further object of this invention to provide a missile control system especially adapted for use with small missiles where simplicity, reliabilty, and low cost are of prime importance.

It is yet another object of this invention to provide a control system loop which is closed through missile dynamics causing in effect a proportional control of the missile errors with an insignificant limit cycle being superimposed on the missile controller.

The foregoing and other objects of the invention will become more fully apparent from the following detailed description of exemplary structure embodying the invention and from the accompanying drawings, in which:

The figure is a block diagram illustrating a missile control system incorporating the present invention.

An "off-on" type missile control system according to the present invention uses an appropriate error measuring device 11 such as a gyroscope. An arrangement of two gyroscopes (for sensing pitch and yaw) will yield outputs of the basic error terms necessary for correction of missile attitude. The output of error sensor 11 is an error signal and, like any gyroscope output signal this signal contains a certain amount of noise which can affect the dynamic behavior of the missile. To improve the shape of this signal it is applied to shaping circuits 13 which may simply consist of filters for removing the noise and suitable gain control for providing weighting to insure linearity of the signal, to give the desired missile response for any given acceleration. The signal is then fed to a preset threshold level unit 15 which determines whether the error is above or below a preset threshold level. The natural ability of some electronic circuits to form a threshold may perform this function, in which case threshold 15 would not be required. The resulting signal is either an "off" signal or an "on" signal. The "on" signal is either a signal of such condition to later cause an on-off-on switch 17 to demand control force to be effected in a positive direction or a signal of such condition to later cause switch 17 to demand control force to be effected in a negative direction. The "off" signal is of such condition that no signal is applied to actuator 21 and accordingly, no control force is effected. A power source 19 which may be electrical, hydraulic, or pneumatic is connected to actuator 21 to supply the necessary torque for a controller 23. Switch 17, then as demanded, controls the power from source 19 by means of actuator 21 to effect force from controller 23 in the demanded direction. The same maximum force is developed in either control direction or, in the case of an "off" signal there is no force. Controller 23 in this system would be represented by jet vanes on the missile. Depending on the actuator system response time and how long it takes to return the error at shaping circuits 13 to within the threshold at the preset threshold unit 15, the force to which controller 23 is capable of going may not be reached. The forces exerted on the missile by controller 23 control the dynamic behavior of the missile. Whenever the dynamic behavior of the missile changes the change is sensed by error sensors 11 which produce an error signal until this signals falls within the preset threshould boundary. Proportional action of the missile trajectory flight is thus effected by this "off-on" system of control. The system described so far has been with reference to a single axis of sensitivity and control and for each axis (pitch, roll, and yaw) there would of course be a separate error sensor and associated controls.

While the invention has been described with reference to a preferred embodiment thereof, it will be apparent that various modifications and other embodiments thereof will occur to those skilled in the art within the scope of the invention. Accordingly, I desire the scope of my invention to be limited only by the appended claim.

The invention claimed is:

An off-on type missile control system comprising: an error sensor for providing a signal representative of missile attitude, a shaping circuit connected to said sensor for shaping the signal to a desired form, a threshold unit connected to said shaping circuit, an on-off-on switch connected to said threshold unit and responsive to said shaped signal for providing a first output signal when said shaped signal is below a predetermined level and a second output signal when said shaped signal is above a predetermined level, an on-off-on actuator connected to and responsive to said on-off-on switch, a power source connected to and controlled by said actuator, said power source delivering maximum power in a first direction when said actuator is "on" in response to said first output signal and maximum power in a second direction when said actuator is "on" in response to said second output signal and zero power when said actuator is "off," and a missile control means connected to said actuator and responsive to said power source for controlling missile dynamics.

References Cited
UNITED STATES PATENTS

| | | | |
|---|---|---|---|
| 2,981,500 | 4/1961 | Carlton | 244—14 |
| 3,004,734 | 10/1961 | Radford | 244—14 |
| 3,073,550 | 1/1963 | Young | 244—14 |
| 3,104,081 | 9/1963 | Arnett | 244—14 |
| 3,184,182 | 5/1965 | Mays et al. | 102—50 X |
| 3,188,958 | 6/1965 | Burke et al. | 102—50 |

BENJAMIN A. BORCHELT, *Primary Examiner.*

M. F. HUBLER, *Assistant Examiner.*